April 9, 1929. J. X. MATHIEU 1,708,769
WELDING MACHINE
Filed Nov. 24, 1926 2 Sheets-Sheet 1
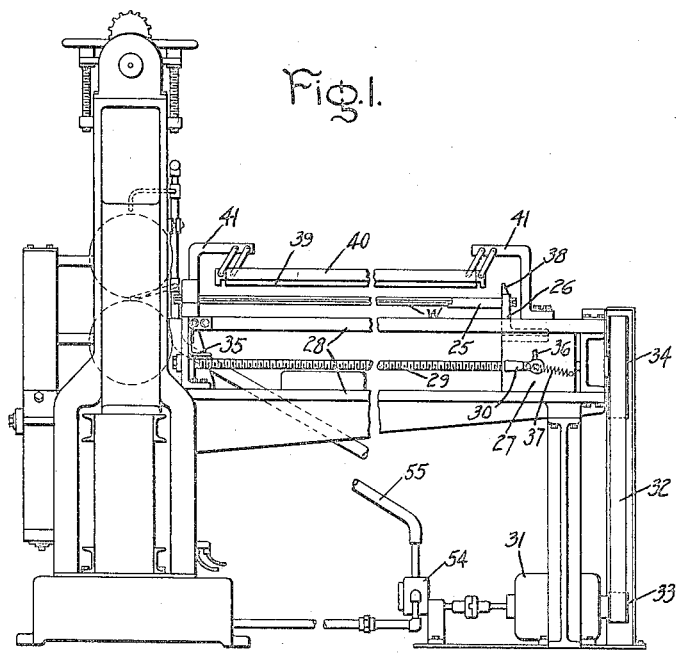
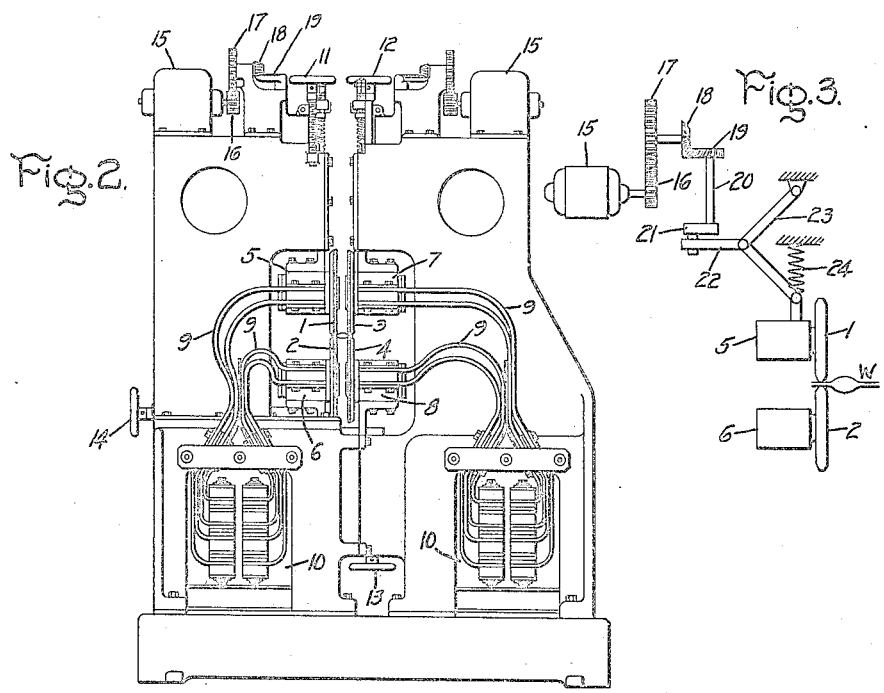
Inventor:
Joseph X. Mathieu,
by his Attorney.

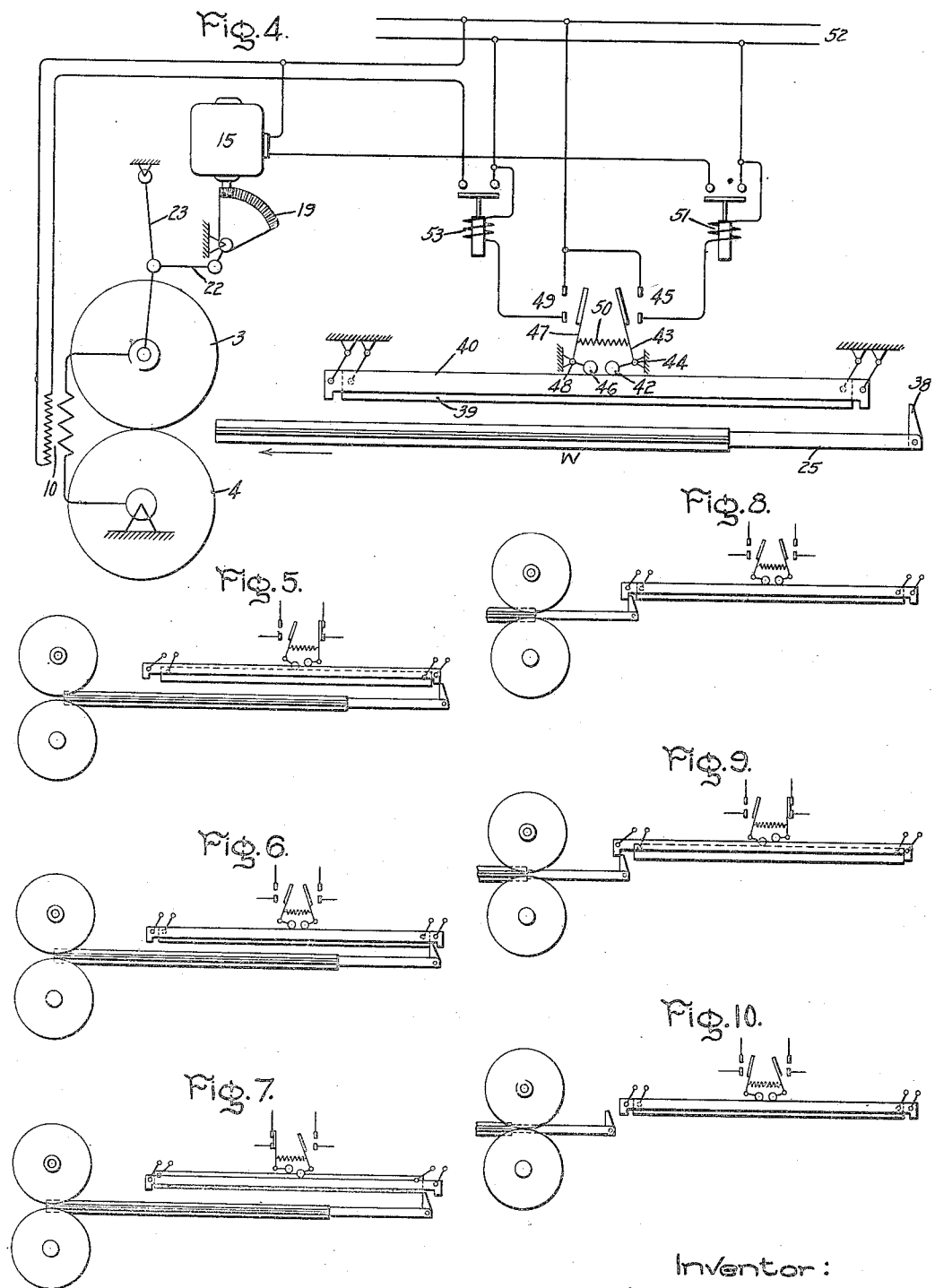

Patented Apr. 9, 1929.

1,708,769

UNITED STATES PATENT OFFICE.

JOSEPH X. MATHIEU, OF PITTSFIELD, MASSACHUSETTS, ASSIGNOR TO GENERAL ELECTRIC COMPANY, A CORPORATION OF NEW YORK.

WELDING MACHINE.

Application filed November 24, 1926. Serial No. 150,570.

My invention relates to welding machines, and particularly to electric resistance welding machines adapted for welding together sheets along an extended seam or line, and has as an object the provision of an improved means for automatically controlling the advance and retraction of an electrode and the application and removal of welding current at the beginning and end of a seam.

The novel features which I believe to be characteristic of my invention are set forth with particularity in the appended claims. The invention itself, however, both as to its organization and method of operation, together with further objects and advantages thereof, will be understood best by reference to the following description taken in connection with the accompanying drawings in which Figs. 1 and 2 show respectively side and front views of a tube welding machine embodying my invention, Fig. 3, a detail of this machine showing the apparatus for raising an electrode roll, and Figs. 4 to 10, diagrams illustrating the sequence of operations taking place in the machine during welding.

The machine shown in Figs. 1 and 2 is adapted for simultaneously welding the longitudinal seams between two complementary pipe sections provided with flanged edge portions, and consists essentially of two pairs of welding wheels or electrodes 1, 2 and 3, 4 mounted in suitable bearings 5, 6 and 7, 8 connected through flexible bus bars 9 to the low tension sides of welding transformers 10. Three of the electrodes, 1, 3 and 4, may be adjusted vertically by hand wheels, 11, 12 and 13 to take care of changes in their diameter as they are dressed down from time to time and the left-hand pair of electrodes 1 and 2 may be simultaneously adjusted in a horizontal direction by a hand wheel 14 so as to provide for different widths of tube and to facilitate the removal and replacement of wheels before and after dressing.

Means are provided for raising the movable electrodes 1 and 3 from the stationary electrodes 2 and 4 as the tube enters between them. The apparatus for raising electrode 1 is shown in Fig. 3. As the mechanism for raising electrode 3 is identical, the description with reference to electrode 1 is to be taken as applying likewise to electrode 3.

Referring to Fig. 3, electromagnetic means illustrated as a motor 15 operates through pinions 16 and 17 and a beveled gear 18, a segmental bevel gear 19 which through shaft 20 turns a crank 21. This crank is connected by a rod 22 to a toggle joint 23 in such a manner as to raise the electrode 1 against the pressure of a spring 24 when the motor 15 is energized through the action of a control bar to be presently described. When the motor 15 is deenergized, spring 24 forces the electrode 1 downward against the work W which has been inserted between the electrodes 1 and 2. The electrode pressure is adjusted by varying the tension of spring 24.

The work W is supported by a mandrel 25 which is bolted to a bracket 26 mounted on a block 27 located in the frame of the machine between parallel ways 28. The block 27 encloses a split nut (not shown) which when connected to the lead screw 29 by means of a lever 30 propels the block 27 to the left of the machine between the ways 28 when motor 31 operating through belt 32 and pulleys 33 and 34 suitably rotates the lead screw 29. When the welding operation has been completed, a stop 35 engages a projecting lug 36 forming part of the lever 30 and tilts this lever in a manner to open the split nut and stop the movement of the work. To assist in this operation, a spring 37 attached to the lever 30 and to the block 27 is provided. For the purpose of convenience, that part of the machine just described which supports the work and advances it through the welding wheels will hereafter be termed the work carriage.

This work carriage is provided with a projecting member or dog 38 which is arranged to engage progressively two movably supported control bars 39 and 40 illustrated as pivotally connected to frame members 41 and arranged to automatically control by their movement the switching on and off of the welding current and the operation of the motors 15 for raising and lowering the electrodes, as will now be described in connection with Figs. 4 to 10. These bars, as will be noted by reference to Fig. 1, are preferably given an initial displacement to the left by suitable stops so that for a given horizontal movement of the bars there will be a greater vertical movement, which movement is used in the illustrated machine to control through suitable switches the welding operation. The switches controlled by bars 39 and 40 are not illustrated in Fig. 1.

In Fig. 4 the tube to be welded is shown at W supported by a mandrel 25 which is mounted on the welding carriage, as previously described. To this mandrel is pivoted dog 38 so arranged as to engage the control bars 39 and 40. Control bar 40 operates through a roller 42 which engages its upper surface and a crank 43 pivotally mounted at 44, a relay switch 45, and control bar 39 operates through a roller 46 and crank 47 pivoted at 48, a relay switch 49. The control bars 39 and 40 normally rest in their lower position, which corresponds to the open position for relay switches 45 and 49. These switches are held in their open position by a spring 50 connected between the crank members 43 and 47 which support the bridging contacts of switches 45 and 49. Relay switch 45, when closed, operates a contactor 51 by connecting its operating coil across the supply circuit 52 and relay switch 49, when closed, operates a contactor 53 by closing its operating coil across the supply circuit 52. Contactor 51 controls the energization of motor 15, which operates to raise the welding electrode 3 and contactor 53 connects or disconnects the primary of the welding transformer to or from the source of supply to control thereby the flow of welding current between the welding electrodes.

In Fig. 4 the work W has just been inserted in the machine and the motor 15 and transformer 10 are deenergized. To start the welding operation, the operator starts the carriage by turning lever 30 to the left to close the lock nut included within the block 37 about the lead screw 29 and then completes the circuit of motor 31. This motor then operates to turn the lead screw 29 which moves the carriage in the direction of the arrow to introduce the work between the welding rolls. When the dog 38 reaches the position shown in Fig. 5, it engages bar 40 and, by moving it to the left and upward about its points of suspension, closes relay switch 45 which in turn energized contactor 51 to energize the motor 15 and raise the welding wheel 3 so as to leave a small space between it and its cooperating wheel 4 for the introduction of the work W. As the left-hand end of the work W comes between the wheels 3 and 4, dog 38 slips from under the end of bar 40 and thereby opens switch 45 and deenergizes motor 15. This condition is shown in Fig. 6. Spring 24, previously described, then forces wheel 3 downward and applies the desired pressure between wheels 3 and 4 to the work W.

Immediately after relay switch 45 has opened, the dog 38 engages bar 39 and by moving it to the left and upwards, closes relay switch 49. This operates contactor 53 which completes the circuit of the welding transformer 10 and causes welding current to flow between the electrodes 3 and 4 to the work W. This condition is shown in Fig. 7. The welding operation then continues until the tube has nearly reached the end of its travel. At this point the dog 38 slips from under the bar 39, as shown in Fig. 8, and opens relay switch 49 and interrupts the welding current. Immediately after this the dog 38 comes in contact with the left-hand end of bar 40, as shown in Fig. 9, and by so doing closes relay switch 45 which by energizing motor 15 lifts the welding electrode 3 from the work. As the work carriage moves still further to the left, the dog 38 releases the bar 40 and allows it to return to its original position, as shown in Fig. 10, thereby opening relay switch 45 and deenergizing the motor 15.

The movement of the welding carriage is interrupted when stop 35 comes in engagement with the lug 36 attached to lever 30 to operate this lever in a manner to disengage the clamp nut from the feed screw 29. The operator then removes the welded tube from the carriage and returns the carriage to its initial position. During the operation the dog 38 turns on its pivot so that the bars 39 and 40 are not raised. The dog may be returned to its normal position by a spring or the equivalent. The motor 31, besides driving the lead screw 29, also drives a pump 54 which supplies suitable cooling fluid through a pipe line 55 to the welding electrodes.

From the foregoing it will be noted that the application and removal of the pressure and current are entirely automatic and are controlled by the motion of the work carriage which is automatically stopped at the end of its travel. Although, as illustrated the return of the carriage to its original position is taken care of by the operator, it is apparent that it could readily be returned to its initial position by the automatic operation of a suitably designed machine, should this prove desirable.

In the construction illustrated control bars of different lengths may be used for each length of tube required and for this reason bars 39 and 40 are made removable and may be replaced by other bars of suitable length. By this means the current and pressure are applied and removed at the proper time.

While I have shown my invention as applied to a machine adapted to make a plurality of welds, it is to be understood that my invention is equally applicable to a machine adapted for making a single weld. Furthermore, the organization and construction of the machine may be variously modified without departing from the spirit and scope of my invention. For example, the control bars may be suspended from the work carriage and the operating member or dog from the machine frame, or the electrodes may be made movable and the work stationary, and the control bars and dog suitably arranged in any desired manner for the accomplishment of the function set forth above. Furthermore, instead of a plurality of electrode rolls for engaging the work on opposite sides, a single roll may be used for operating with a fixed electrode for the same purpose. Those parts of the bars that are engaged by the dog member may assume any shape and form appropriately to control the welding operation. For example, the bar that controls the welding current may be provided with spaced projections so that periodically the welding current will be interrupted and the seam broken at predetermined points and the bar that controls the movement of the electrode may be so constructed that the electrodes will be raised over obstructions in the line of the weld.

The described embodiment of my invention has been selected for the purpose of clearly setting forth the principles involved, but, as heretofore set forth, the invention may be variously modified to meet the different conditions encountered in its use, and I aim, therefore, to cover by the appended claims all modifications within the true spirit and scope of my invention.

What I claim as new and desire to secure by Letters Patent of the United States is:—

1. In a welding machine wherein at least one electrode and the work are arranged to be moved relatively for the production of a seam, switch means for controlling the welding operation, a pivotally supported control bar arranged to operate said switch means, means arranged to engage said control bar at predetermined points along its length for operating the same, and means for moving said engaging means and control bar relatively during relative movement of the electrode and the work.

2. In a welding machine wherein at least one electrode and the work are arranged to be moved relatively for the production of a seam, electromagnetic means for moving said electrode into and out of engagement with the work, a movably supported control bar for actuating said electromagnetic means, means arranged to engage said control bar at predetermined points along its length for operating the same, and means for moving said engaging means and control bar relatively during relative movement of the electrode and the work.

3. A resistance line welding machine comprising an electrode movable into and out of engagement with the work, electromagnetic means for operating said electrode, a movably supported control bar arranged to control by its movement the energization and deenergization of said electromagnetic means, means for operating said control bar, and means for producing relative movement between said electrode and the work and between said control bar and its operating means to control thereby the application and removal of the electrode pressure at the beginning and end of a seam to be welded.

4. A resistance line welding machine comprising an electrode for engaging and leading current into the work, means for producing relative movement between the electrode and the work along the line of the weld, means comprising an electric motor for controlling the movement of the electrode into and out of engagement with the work, switch means for controlling the operation of said motor, a movably supported control bar arranged to operate said switch means, means arranged to engage said control bar at predetermined points along its length for operating the same, and means for moving said engaging means and control bar relatively during relative movement of the electrode and the work.

5. A resistance line welding machine comprising a rotatable electrode for engaging and leading current into the work, means for producing relative motion between the electrode and the work along the line of the weld, means comprising an electric motor for moving said electrode into and out of engagement with the work, switch means for controlling the circuit of said motor and for controlling the welding circuit, and means arranged to be operated by relative movement between the electrode and the work along the line of the weld for operating said switch mechanism successively to separate the electrode from the work, move the electrode into engagement with the work, and complete the welding circuit.

6. A resistance welding machine adapted for welding work along an extended seam comprising an electrode movable into and out of engagement with the work, electromagnetic means for operating said electrode, means for controlling the welding current exterior to said electrode, a plurality of movably supported control bars arranged to control by their respective movements the energization and deenergization of the electromagnetic means for controlling the electrode and the supply of welding current to the electrode, means for engaging said control bars, and means for producing relative movement between said electrode and the work and said control bars and their operating means to retract the electrode for the insertion of work and thereafter advance the electrode to the work, to complete the welding circuit and thereafter interrupt it and to retract the electrode for the removal of the work and thereafter return it to its initial position.

7. A resistance line welding machine comprising an electrode for engaging and leading current into the work, means for producing relative movement between the electrode and the work along the line of the weld, means comprising an electric motor for controlling the movement of the electrode into and out of engagement with the work and switch means operated by the relative movement of the electrode along the work for controlling the operation of said motor.

8. In a resistance line welding machine wherein an electrode is moved relatively to the work for the production of a seam, means normally forcing said electrode into engagement with the work, means comprising an electric motor for withdrawing said electrode from the work, and switch means arranged to be operated by the relative movement of the electrode and the work during the production of the seam to control the operation of said motor.

In witness whereof, I have hereunto set my hand this 22nd day of Nov., 1926.

JOSEPH X. MATHIEU.